(12) United States Patent
Lee et al.

(10) Patent No.: US 9,589,112 B2
(45) Date of Patent: Mar. 7, 2017

(54) METHOD, DEVICE, AND SYSTEM FOR DOWNLOADING CONTENTS ON THE BASIS OF A RIGHTS VERIFICATION

(75) Inventors: Minsoo Lee, Seoul (KR); Seungryul Yang, Seoul (KR); Jangwoong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 14/348,513

(22) PCT Filed: Aug. 7, 2012

(86) PCT No.: PCT/KR2012/006268
§ 371 (c)(1),
(2), (4) Date: Mar. 28, 2014

(87) PCT Pub. No.: WO2013/047997
PCT Pub. Date: Apr. 4, 2013

(65) Prior Publication Data
US 2014/0230074 A1    Aug. 14, 2014

Related U.S. Application Data

(60) Provisional application No. 61/540,541, filed on Sep. 29, 2011.

(51) Int. Cl.
*G06F 21/10* (2013.01)
*G06Q 30/00* (2012.01)

(52) U.S. Cl.
CPC ........... *G06F 21/10* (2013.01); *G06Q 30/018* (2013.01)

(58) Field of Classification Search
CPC .................. G06F 21/10–21/14; G06Q 30/018
See application file for complete search history.

(56) References Cited

U.S. PATENT DOCUMENTS

| | | | |
|---|---|---|---|
| 7,509,685 B2 * | 3/2009 | Lambert | G06F 21/10 705/55 |
| 7,533,061 B1 * | 5/2009 | Cheng | G06Q 30/06 705/50 |

(Continued)

FOREIGN PATENT DOCUMENTS

| | | |
|---|---|---|
| CN | 101375543 A | 2/2009 |
| CN | 101395603 A | 3/2009 |

(Continued)

*Primary Examiner* — Matthew Smithers
(74) *Attorney, Agent, or Firm* — Birch, Stewart, Kolasch & Birch, LLP

(57) ABSTRACT

The present invention relates to a method, device, and system for downloading contents on the basis of a rights verification. The content download method is performed by a first device, which obtains digital rights management (DRM) information on an asset from asset metadata associated with the asset, obtains DRM capabilities on a second device, performs a rights verification for using the asset through the second device on the basis of the DRM information and the DRM capabilities that are obtained, and transmits a queuing request for staging the asset through the second device on the basis of the results of the rights verification. Thus, to enable the consumption of contents, the rights verification may be performed on the basis of device capabilities and content information, and contents may be stably and effectively downloaded using a target device on the basis of the verified results.

18 Claims, 10 Drawing Sheets

(56) References Cited

U.S. PATENT DOCUMENTS

| | | | |
|---|---|---|---|
| 8,468,608 B1* | 6/2013 | Hernacki | G06F 21/10 726/1 |
| 9,280,773 B1* | 3/2016 | Evans | G06Q 20/4014 |
| 2004/0005876 A1* | 1/2004 | Tuoriniemi | H04M 1/72563 455/411 |
| 2004/0249815 A1 | 12/2004 | Lee | |
| 2005/0210249 A1 | 9/2005 | Lee et al. | |
| 2006/0031164 A1 | 2/2006 | Kim | |
| 2006/0080740 A1* | 4/2006 | Bremer | G06F 21/10 726/26 |
| 2006/0156416 A1* | 7/2006 | Huotari | H04L 63/08 726/27 |
| 2006/0195864 A1* | 8/2006 | New | G06F 17/30766 725/25 |
| 2006/0253874 A1* | 11/2006 | Stark | G06F 3/038 725/62 |
| 2007/0157072 A1 | 7/2007 | LaBiche | |
| 2007/0172065 A1 | 7/2007 | Lee et al. | |
| 2007/0299778 A1* | 12/2007 | Haveson | H04L 63/107 705/51 |
| 2008/0249946 A1* | 10/2008 | Candelore | G06F 21/10 705/59 |
| 2009/0025085 A1* | 1/2009 | Kim | G06F 21/10 726/26 |
| 2010/0146629 A1 | 6/2010 | Rahman et al. | |
| 2010/0235550 A1* | 9/2010 | Bolton | G06F 13/385 710/62 |
| 2010/0313038 A1* | 12/2010 | Bradley | G06Q 20/1235 713/189 |
| 2010/0333209 A1* | 12/2010 | Alve | G06F 21/10 726/26 |

FOREIGN PATENT DOCUMENTS

| | | |
|---|---|---|
| CN | 101631288 A | 1/2010 |
| CN | 102142065 A | 8/2011 |
| KR | 10-2004-0107602 A | 12/2004 |
| KR | 10-2005-0094317 A | 9/2005 |
| KR | 10-0677344 B1 | 2/2007 |
| KR | 10-2007-0098417 A | 10/2007 |

* cited by examiner

FIG. 3

| Interface | Server | Client | Transport Protocol | Notes |
|---|---|---|---|---|
| D1 | Content Server | QPE | As defined in Clause 10 | |
| P1 | Content Policy Server | QPE | HTTP/1.1 or HTTPS/1.1 | |
| D2 | QPE | Player | As defined in Clause 10.2.2 | |
| Q2 | QPE | Local Application | HTTP/1.1 or HTTPS/1.1 or an implementation specific transport | Local applications may use an implementation-specific transport if supported by the Client |
| P2 | Network Policy Client | QPE | Implementation-specific IPC transport | |
| D3 | Intermediate Device | QPE | HTTP/1.1 or HTTPS/1.1 | |
| Q3 | QPE | Intermediate Device | UPnP/HTTP/1.1 as defined in Clause 10 | |
| D4 | Content Server | Intermediate Device | HTTP/1.1 or HTTPS/1.1 | |
| P4 | Content Server | Intermediate Device | HTTP/1.1 or HTTPS/1.1 | Only Policy XML structures may be downloaded in this manner |
| Q4 | Content Server | Intermediate Device | HTTP/1.1 or HTTPS/1.1 | Q4 transactions may be initiated by the Content Server via an external trigger not defined in this specification |
| S | Virtual Storage Device | QPE | Implementation-specific transport | |

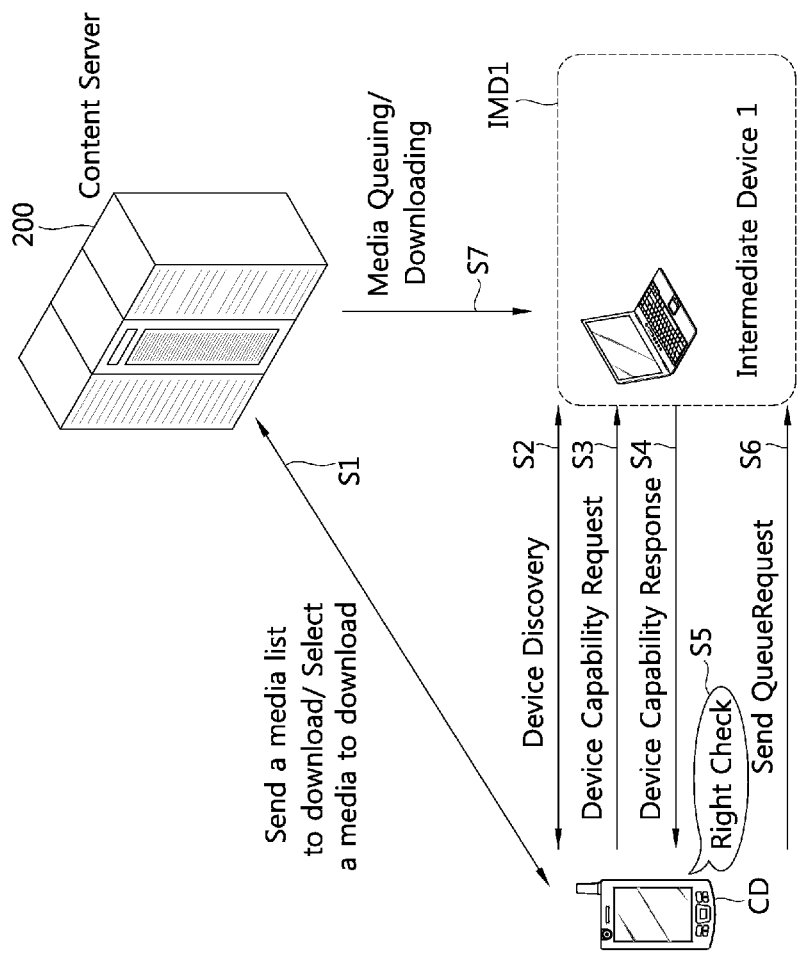

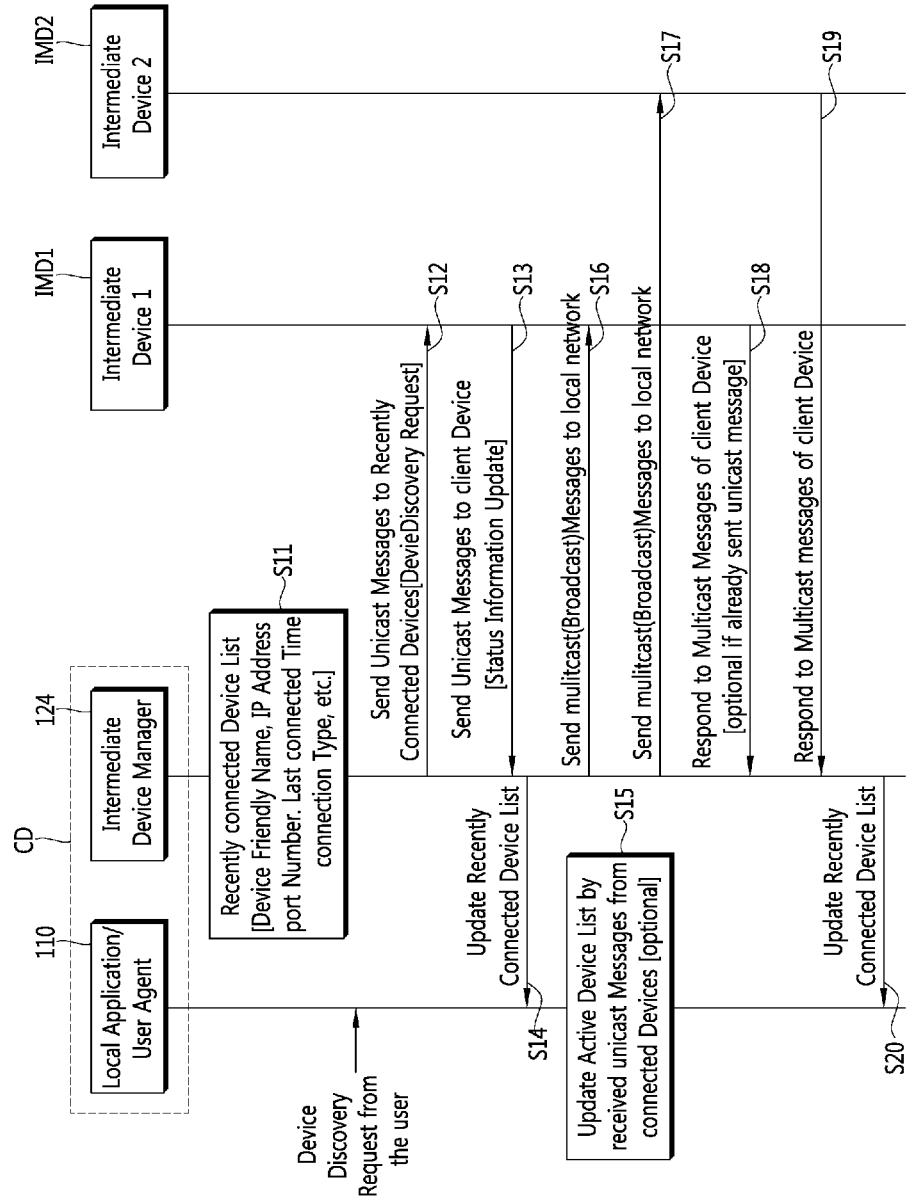

FIG. 6

Device Capability Stracture

| Capability Item | Type |
| --- | --- |
| Device ID | URI |
| Device Name | String |
| Device FriendlyName | String |
| User ID | String |
| CurrentPowerSource | String → "AC Power" "Battery" |
| Charging Status | String |
| Power Level | UINT |
| Supporting Media Profiles (Formats) | PD,SD,HD |
| Supporting Codec Types | MIME type |
| Storage Capacity (GBytes) | Unsigned Long |
| Storage Function Groups | String |
| PointNode | String |
| Storage Usage | UINT[0:100] |
| Maximum Size of QueueRequest | UINT |
| Maximum number of QueueRequest | UINT |
| Current number of QueueRequest | UINT |
| NetworkInterfaceNumberOfEntries | UINT |
| Network Access Type (/UPnP/DM/DeviceInfo/PhysicalDevice/NetworkInterface/#/) | String(Ethernet, 802.11, MpCA, Bluetooth |
| Media Transport | HTTP (Mandatory)RTP (Optional) |
| Bandwidth Limit (MBytes) | UINT |

FIG. 8

| UPnP CDS Property | Value |
|---|---|
| upnp:foreignMetadata@type | "uvvu.com_mddece" |
| upnp:foreignMetadata::fmId | Value of mddece:APID |
| upnp:foreignMetadata::fmClass | "UltraViolet Container" + value of mddece: DECEMe diaProfile |
| upnp:foreignMetadata::fmProvider | Value of mddece:Publisher |
| upnp:foreignMetadata:: fmBody@xmlFlag | 1 |
| upnp:foreignMetadata::fmBody:: fmEmbeddedXML | mddece:MetadataMovie including all child elements |
| upnp:class | "object.item.videoItem.dece" |
| dc:title | value of mddece:TitleDisplay60 |
| res@duration | Value of RunLength converted to "H+:MM:SS" format |
| dc:date | Value of mddece:ReleaseDate converted to [ISO 8601] format |
| dc:description | Value of mddece:Summary190 |
| res@protocolInfo | "http-get:*:video/vnd.dece.mp4:*" |

FIG. 9

| Capability Item | Type | Example |
|---|---|---|
| DRM Specific Name space | String | <root xmlns="urn:schemas-upnp-org:device-1-0" xmlns:ms="urn:microsoft-com:wmc-1-0"> |
| DRM Specific Information | String | <device ms:X_MS_SupportsWMDRM="true"> |
| DRM Name | String | WMDRM |
| DRM Version | String | |

FIG. 10

| Content Item | Type | Example |
|---|---|---|
| Content ID | String | |
| Source URI | URI | http://168.192.1.1/DECE-DCC.uvvu |
| Network | String | * |
| Protocol | String | HTTP-GET |
| MIME Type | String | video/vnd.dece.mp4 |
| AdditionalInfo | String | * |
| DRM Name | String | DECE |
| DRM Version | String | 1.0 |

METHOD, DEVICE, AND SYSTEM FOR DOWNLOADING CONTENTS ON THE BASIS OF A RIGHTS VERIFICATION

CROSS REFERENCE TO RELATED APPLICATIONS

This application is the National Phase of PCT/KR2012/006268 filed on Aug. 7, 2012, which claims priority under 35 U.S.C. 119(e) to U.S. Provisional Application No. 61/540,541 filed on Sep. 29, 2011, all of which are hereby expressly incorporated by reference into the present application.

TECHNICAL FIELD

The present invention relates to a content downloading method, device, and system based on a rights check, and more particularly, to content downloading technology in which a rights check based on device capabilities and content information for the consumption of content may be performed and content may be downloaded through a target device.

BACKGROUND ART

Recently, as data communication standards and the standardization of a terminal are carried out and devices become intelligent, a need to construct a more efficient and convenient system by associating a plurality of devices and services with each other is increased. A representative example that complies with such a need is a home network. A home network associates devices and services that are distributed at several places through wired or wireless communication.

In general, such a home network is based on Digital Living Network Alliance (DLNA). DLNA is a public cooperation organization for the commercialization of a home network. In DLNA, a compatible platform is constructed based on already constructed industry standards, for example, IP, HTTP, Universal Plug and Play (UPnP), and Wi-Fi. Companies that develop home appliances, wireless devices, and PC-related devices are introducing a guide line for product development based on DLAN industry standards related to a home network.

A home network may provide a content sharing environment in which digital content can be shared between devices or between heterogeneous services. For example, content stored in a specific device may be transmitted to another device, and the content may be played back through the device or content stored in a content server may be downloaded and played back by another device in response to a request from a specific device. For example, Korean Patent Application Publication No. 2009-0001973 and Korean Patent Application Publication No. 2010-0062799 describe technologies in which the domain of a plurality of devices operating in conjunction with each other over a network is configured and content may be shared between the devices within the domain.

Meanwhile, digital content is advantageous in that it may be freely distributed and obtained, but digital content may be easily exposed to an unlawful act, such as unapproved copy or spill, because it may be copied unlimitedly even without a loss of the data. Accordingly, in order to create a sound digital content use environment, content protection technology capable of safely protecting digital content from unlawful acts needs to be supported.

Digital Rights Management (DRM) is comprehensive digital content protection system for preventing the illegal copy and use of digital content and allowing only a user who has legal rights to use approved digital content. Such DRM adopts various element techniques, such as the safe distribution and spread of content, control of content use rights according to the policy, encoding, and decoding.

In order for content to be used legally and conveniently under a content sharing environment, DRM needs to be applied properly and compatible. To this end, an operating model capable of defining the entities and resources of a related system and generating and managing the defined system entities and resources needs to be able to be proposed. Furthermore, security means, procedures, and operating scenarios based on the defined system resources and the operating model need to be able to be proposed. Accordingly, there is an urgent need for the development of related technologies according to such a need.

DISCLOSURE

Technical Problem

The present invention has been made to solve the problems, and an object of the present invention is to provide a content downloading method, device, and system based on a rights check using device capabilities and content information.

Technical Solution

In order to achieve the object of the present invention, in an aspect, the present invention provides a content downloading method based on rights check. The content downloading method is performed by a first device and includes obtaining digital rights management (DRM) information of an asset from asset metadata associated with the asset; obtaining a DRM capability on a second device; performing rights check for using the asset through the second device based on the DRM information and the DRM capability that are obtained; and transmitting a queue request for staging the asset through the second device to the second device based on the rights check.

The content downloading method may further include receiving a content list from a server; displaying the content list; and receiving a selection signal based on the displayed content list and selecting at least one asset corresponding to the selection signal.

The content downloading method may further include transmitting a device capability request requesting a capability of the second device to the second device; receiving a device capability response including the capability of the second device from the second device; and selecting at least one asset suitable for staging through the second device based on the received device capability.

The content downloading method may further include checking the DRM information obtained from the asset metadata associated with the asset; and determining whether the asset is protected by the DRM, based on the checking the DRM information.

The DRM information of asset may be specified by at least one of Dynamic Adaptive Streaming over HTTP (DASH) Media Presentation Description (MPD) information, Universal Plug and Play (UPnP) Content Directory Service (CDS) metadata, and Multipurpose Internet Mail Extension (MME) type information.

The rights check may be used when the first device requests staging an asset through a second device which directly consumes the asset, or the first device which directly consumes the asset request an asset staged through the second device, performed before the queue request enters into an active state, and when the rights check is failed, a queue request requiring the rights check is transited to a blocked state.

The obtaining of the DRM capability on the second device may includes obtaining the DRM capability on the second device from a content format value of UPnP device description or UPnP CDS protocol information of the second device.

The obtaining of the DRM capability on the second device may includes obtaining the DRM capability on the second device from a specific field included in the device capability received from the second device through exchanging of the device capability with the second device. The specific field may be a supporting media profile field, and the information may be a media profile.

The performing of the rights check for using the asset through the second device based on the DRM information and the DRM capability that are obtained may include performing DRM capability check verifying whether the second device can support a DRM system protecting the asset based on the DRM information and the DRM capability on the second device that are obtained; and performing license check verifying whether the second device obtains a license for using the asset.

The performing of the DRM capability check of the second device may include checking whether the second device supports the DRM protecting the asset, by comparing asset content protecting demand and policy according to the DRM capability of the second device and the DRM information of the asset with the DRM capability of the second device. The DRM information of the asset may be specified by one of DASH MPD information, UPnP CDS metadata, and MIME type information.

The content downloading method may further include performing device discovery in order to discover one or more other devices interlocking through a network; and selecting the second device to transmit the asset among one or more other devices discovered by the device discovery in response a device selection signal.

The performing of the device discovery may include storing a recently connected device list including information about a device which is recently connected through the network; unicasting a first device discovery request to another device included in the recently connected device list, when connected to the network; receiving a first device discovery response to the first unicast device discovery request from another device; and updating the recently connected device list based on the received first device discovery response.

The content downloading method may further include updating an active device list representing an active state device based on the received first device discovery response; and displaying at least one of the updated active device list and the updated recently connected device list. The selecting of the second device may include selecting the second device in one of the displayed active device list and the updated recently connected device list.

Meanwhile, in order to achieve the object of the present invention, in another aspect, the present invention provides a device. The device may include an application configured to select an asset and a target device and a queue and policy engine configured to obtain DRM information of an asset from asset metadata associated with the asset, obtain a DRM capability on a second device, perform rights check for using the asset through the second device based on the DRM information and the DRM capability that are obtained, and transmit a queue request for staging the asset through the second device to the second device based on the rights check.

The queue and policy engine may verify the DRM information obtained from the asset metadata associated with the asset and determine whether the asset is protected by the DRM based on the checking of the DRM information. The queue and policy engine may perform the rights check for using the asset through the second device based on the DRM information and the DRM capability that are obtained, perform DRM capability check verifying whether the second device can support a DRM system protecting the asset based on the DRM information and the DRM capability on the second device that are obtained, and perform license check verifying whether the second device obtains a license for using the asset.

Meanwhile, in order to achieve the object of the present invention, in further another aspect, the present invention provides a system. The system may include a second device; and a first device configured to obtain DRM information of an asset from asset metadata associated with the asset, obtain a DRM capability on a second device, perform rights check for using the asset through the second device based on the DRM information and the DRM capability that are obtained, and transmit a queue request of requesting staging the asset through the second device to the second device based on the rights check.

Advantageous Effects

As described above, in accordance with the present invention, an efficient device discovery and device capability exchange can be performed, a rights check based on device capabilities and content information for the consumption of content can be performed, and content can be downloaded to a target device stably and effectively based on the rights check.

DESCRIPTION OF DRAWINGS

FIG. 3 is a table illustrating the interfaces shown in FIG. 2.

FIG. 4 is a flowchart illustrating the content downloading method according to a preferred embodiment of the present invention.

FIG. 5 is a flowchart illustrating a device discovery method based on a recently connected device list.

FIG. 6 shows a table illustrating the structure of device capabilities in the content service system.

FIG. 8 shows a table illustrating UPnP CDS properties and values thereof.

FIG. 9 is a table illustrating DRM capabilities for the DRM capability check of a first intermediate device IMD1.

FIG. 10 is a table illustrating the DRM information of an asset for a DRM capability check.

MODE FOR INVENTION

Figure 1:
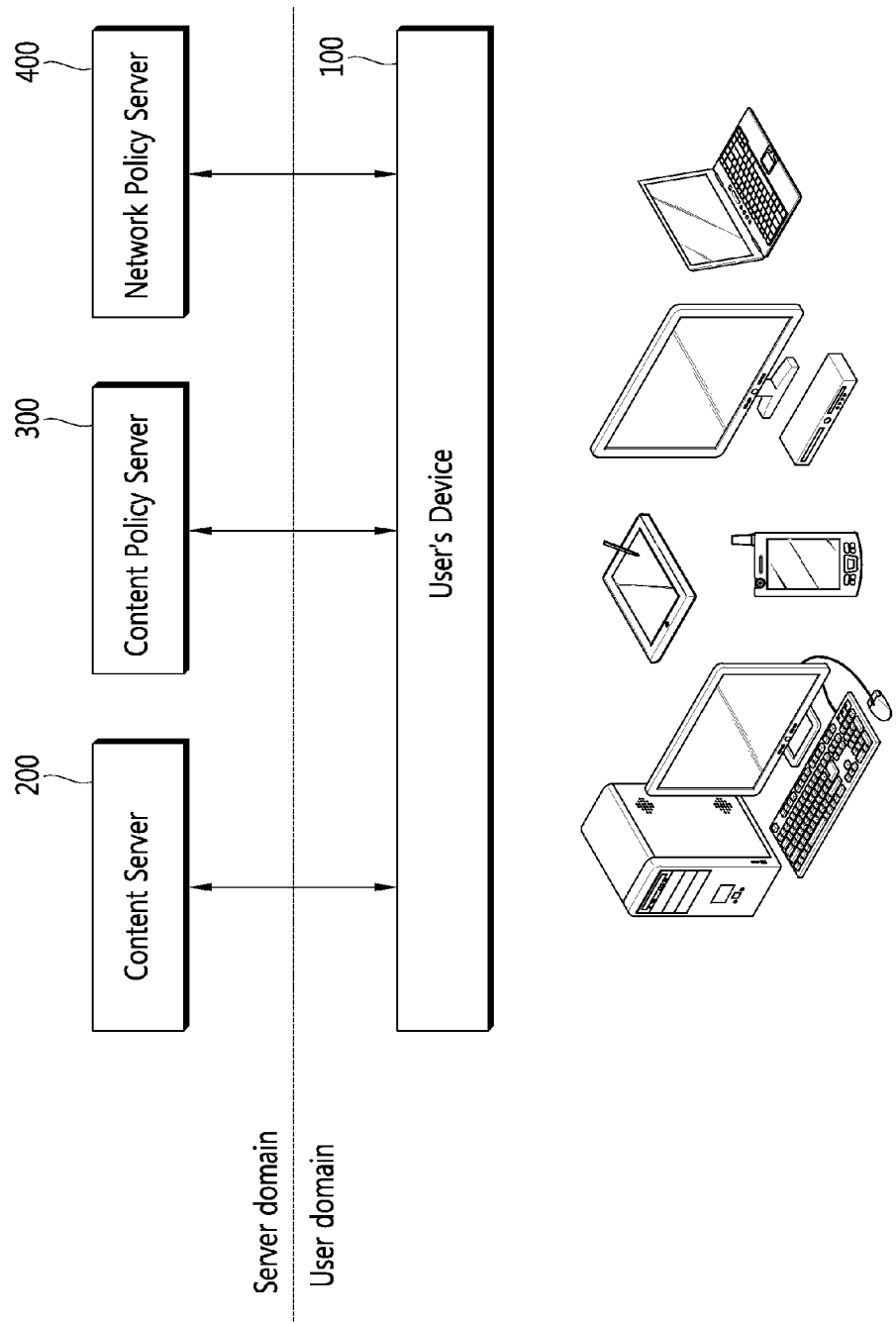
FIG. 1 is a block diagram showing the construction of a content service system to which a content downloading method according to a preferred embodiment of the present invention may be applied.

The present invention may be modified in various ways and may have several embodiments, and specific embodiments are to be illustrated in the drawings and described in detail.

It is however not intended to limit the present invention to a specific embodiment, and it should be understood that the embodiment includes all changes, equivalents, and substitutions that are included in the spirit and technical scope of the present invention.

Terms, such as the first and the second, may be used to describe a variety of elements, but the elements should not be limited by the terms. The terms are used to only distinguish one element from the other element. For example, a first element may be named a second element, and likewise a second element may be named a first element without departing from the scope of the present invention. A term 'and/or' includes a combination of a plurality of related and described items or any one of a plurality of related and described items.

When it is said that one element is described as being 'connected' to or 'coupled' with the other element, the one element may be directly connected to or coupled with the other element, but it should be understood that a third element may be interposed between the two elements. In contrast, when it is said that one element is described as being 'directly connected' to or 'directly coupled' with the other element, it should be understood that a third element is not present between the two elements.

Terms used in this application are used to describe only specific embodiments and are not intended to limit the present invention. An expression of the singular number should be understood to include plural expressions, unless clearly expressed otherwise in the context. Terms, such as 'include' or 'have', should be understood to indicate the existence of a described characteristic, number, step, operation, element, part, or a combination of them and understood to not exclude the existence of one or more other characteristics, numbers, steps, operations, elements, parts, or a combination of them or a possibility addition of them.

All terms used herein, including technical or scientific terms, have the same meanings as those typically understood by those skilled in the art unless otherwise defined. Terms, such as ones defined in common dictionaries, should be construed as having the same meanings as those in the context of related technology and should not be construed as having ideal or excessively formal meanings unless clearly defined in this application.

Hereinafter, preferred embodiments of the present invention are described in more detail with reference to the accompanying drawings. In describing the present invention, in order to help general understanding, the same reference numerals are used to denote the same elements throughout the drawings and a redundant description of the same elements is omitted.

FIG. 1 is a block diagram showing the construction of a content service system to which a content downloading method according to a preferred embodiment of the present invention may be applied.

As shown in FIG. 1, the content service system may be divided into a server domain and a user domain.

The server domain may operate a service, a network policy, etc. for content service and provide content to the user domain based on the policy. That is, the server domain may mean a domain that includes servers for providing content service. Such a server domain may perform the providing of content to the user domain, the operation of service for the user domain, and so on, such as the production, selling, distribution, policy operation, and rights limit of content.

The server domain may include a content server 200 for providing content, a content policy server 300 for operating policies for content services, a content policy server 400 for operating a network policy, etc. The number of content servers may be plural. For example, a server domain may include a content downloading server for downloading content, a content streaming server for streaming content, and so on.

The user domain may include the devices 100 of users. The devices 100 may be fixed type terminals, for example, a PC and a set-top box or may be portable terminals, for example, a smart phone, a portable phone, a mobile handset, a tablet, a Personal Digital Assistance (PDA), and a notebook. The devices 100 may access a local network based on UPnP, a DLNA, and so on and may operate in conjunction with each other through wired or wireless communication.

The device 100 of a user 100 may be a client device or an intermediate device.

The client device may mean a physical hardware device that is equipped with at least one network interface and a local storage. For example, the client device may be a mobile handset, a tablet, a smart phone, a PC or the like which may consume content. The client device CD may include modules for being supplied with content service.

The intermediate device may be a dual role client/server device on a network that may be used for the stage of an asset destined for a client device. The intermediate device may temporarily hold an asset until the asset is delivered to a client device. In general, the intermediate device does not directly consume content, but may directly consume content. For example, the intermediate device may state content. That is, the intermediate device may download content from the content and store and play back the content.

Figure 2:
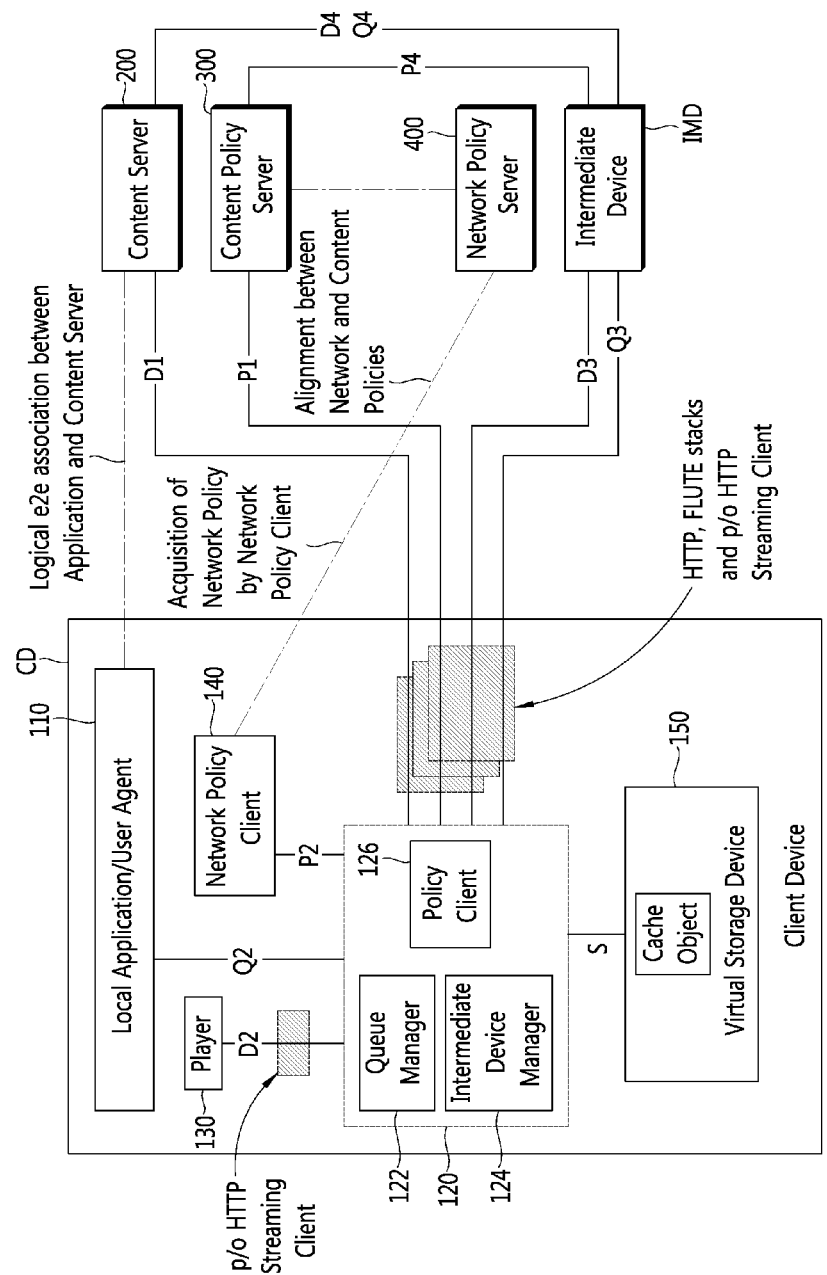
FIG. 2 is a block diagram illustrating a detailed structure of the client device of the content service system and related interfaces.

FIG. 2 is a block diagram illustrating a detailed structure of the client device of the content service system and related interfaces.

As shown in FIG. 2, the client device CD may include a local application 110, a player 130, a network policy client 140, a virtual storage device 150, a Queue/Policy Engine (QPE) 120, etc.

The local application 110 may mean an application for content service. For example, the local application 100 may be a user agent that provides a user interface, a service menu, service selection, content selection, etc. for allowing a user to be supplied with content service. Accordingly, the local application 110 may also be called a user agent.

The player 130 is for playing back content provided through content service and may be, for example, a media player capable of playing back download content or streaming content. The network policy client 140 may obtain a network policy while communicating with the network policy server 400 and control the client device CD according to the obtained network policy.

The virtual storage device 150 is a representation of a local depository that may be accessed through a cache object. For example, the virtual storage device 150 may be a common local depository, such as a hard disk, USB memory connected to a device, flash memory, a virtual region, such as Demon, and so on.

The QPE 120 is a module included in the client device CD, and it may perform communication through interface protocols P1, S, D1, D2, Q2, D3, and Q3. The QPE 120 may maintain a queue on behalf of each local application 110 and the content server 200 and interface with storage, and the QPE 120 may be responsible for synchronizing a queue request with a policy. Accordingly, the QPE may also be called a service client for content sharing service.

Such a QPE 120, that is, a QPE, may include a queue manager 122, a policy client 126, an intermediate device manager 124, etc.

The queue manager 122 may operate a queue for the download or streaming of content. For example, the queue manager 122 may include a stream queue manager and a download manager. The queue manager 122 may transmit a queue request to the intermediate device IMD and receive a corresponding response from the intermediate device IMD or may receive a queue request from the intermediate device IMD and transmit a corresponding response. For example, the queue manager 122 may transmit a queue request, requesting the intermediate device IMD to download specific content from the content server 200, to the intermediate device IMD and receive a corresponding response. The queue manager 122 may transmit a queue request, requesting the intermediate device IMD to transmit content downloaded from the content server 200 to the client device CD, to the intermediate device IMD.

Furthermore, the queue manager 122 may perform a rights check for the use of content. For example, the queue manager 122 may perform a rights check for staging assets, corresponding to content selected by the local application 110, through the intermediate device IMD, for example, a rights check for downloading assets from the content server 200 to the intermediate device IMD. The rights check may include a Digital Right Management (DRM) capability check and a license check.

In the DRM capability check, whether or not an intermediate device IMD may support a DRM system that protects assets may be verified based on DRM information about the assets and DRM capabilities regarding the intermediate device IMD. In the license check, whether or not the license intermediate device IMD may obtain a license for the use of the assets may be verified. For example, the license check may be the check of rights defined in a right token.

The policy client 126 is a subsystem of the QPE 120, and it maintains a policy object. The policy client 126 may control the QPE 120 according to policies from the content policy server 300. For example, the policy client 126 may retrieve policies from the content policy server 300 and adjust a queue request behavior.

The intermediate device manager 124 may manage the intermediate devices IMD that operates in conjunction with the client device CD. For example, the intermediate device manager 124 may discover the intermediate device IMD connected to the network and manage the state of the intermediate device IMD. The intermediate device manager 124 may transmit or receive necessary messages to or from an intermediate device.

FIG. 3 is a table illustrating the interfaces shown in FIG. 2.

As shown in FIG. 3, interfaces related to the content service system may be classified into P, Q, S, and D interface groups. Each of the interfaces may operate in a client-server structure.

The P interface group may define a link and policy between the QPE 120 and the content policy server 300. Such a P interface group may include the interfaces P1 and P2. In the interface P1, a server may be the content policy server 300 and a client may be the QPE 120. In the interface P2, a server may be the network policy client 140 and a client may be the QPE 120. In the interface P4, a server may be the content server 200 and a client may be the intermediate device IMD.

The Q interface group may define queue request handling. The Q interface group may be a primary command channel that associates the content server 200, the intermediate devices IMD and the QPE 120 with each other. The Q interface group may allow a caching functionality to be called by the local application 110. In the Q2 interface, a server may be the QPE 120 and a client may be the local application 110. In the Q3 interface, a server may be the QPE 120 and a client may be the intermediate device IMD. In the Q4 interface, a server may be the content server 200 and a client may be the intermediate device IMD.

The S interface group may abstract storage and a cache capability to a QPE. In the S interface, a server may be the virtual storage device 150 and a client may be the QPE 120.

The D interface group may be used for the transmission of data. In the interface D1, a server may be the content server 200 and a client may be the QPE 120. In the interface D2, a server may be the QPE 120 and a client may be the player 130. In the interface D3, a server may be the intermediate device IMD and a client may be the QPE 120. In the interface D4, a server may be the content server 200 and a client may be the intermediate device IMD.

FIG. 4 is a flowchart illustrating a content downloading method according to a preferred embodiment of the present invention.

As shown in FIG. 4, first, the client device CD may be provided with a content (e.g., media) list from the content server, and the client device CD may select desired content to be downloaded (step: S1). A user tries to download the selected content using one of intermediate devices connected to a home network, for example, a first intermediate device IMD1 based on a request from the client device. The client device CD, the intermediate devices IMD, etc. connected to the home network may operate in conjunction with each other based on Digital Living Network Alliance (DLNA) or Universal Plug and Play (UPnP).

For example, at step S1, the local application 110 of the client device CD may request a media list that may be provided by the content server 200 from the content server 200 and receive a content list from the content server 200. The content list may include information related to each of pieces of content and a piece of or a plurality of pieces of corresponding asset information. The asset may be data represented by a Universal Resource Locator (URL), a Universal Resource Identifier (URI), or a file name. The asset information may include access information on which a content file may be identified and accessed.

The client device CD may display the received content list on a screen. The user may select desired content in the displayed content list through input means, such as the touch screen of the client device CD, a remote controller, or a keyboard. In response to the selection, the input means generates a content selection signal that selects the content. The client device CD may select one or a plurality of assets corresponding to the content that is selected in response to the generated content selection signal. Meanwhile, the user may directly select one or a plurality of assets in the displayed content list through the input means. In response thereto, the input means generates an asset selection signal that selects one or a plurality of assets. The client device CD may select one or a plurality of assets corresponding to the generated asset selection signal.

Next, the client device CD may perform a device discovery procedure in order to discover intermediate devices connected to the network (step: S2). The device discovery procedure may be performed using a common method based on the transmission of a multicast message, but the present invention proposes an efficient device discovery procedure based on a recently connected device list.

FIG. 5 is a flowchart illustrating a device discovery method based on a recently connected device list. This figure illustrates a process of discovering, by the client device CD, intermediate devices IMD connected to the network in the content service system.

As shown in FIG. 5, the intermediate device manager 124 of the client device CD manages a recently connected device list (step: S11). The recently connected device list may mean a list of devices (e.g., an intermediate device and another client device) that had recently been connected to the client device CD over a local network.

The recently connected device list may have been stored in the storage of the client device CD, for example, the virtual storage device 150. For example, the client device CD may generate a recently connected list using information obtained through device discovery when first accessing the network, store the generated recently connected list in the storage, and continue to update the recently connected list based on device information that is obtained whenever device discovery is performed.

The recently connected device list may include items, such as a device-friendly name, an IP address, a port number, the last connected time, and the last connected network access type regarding each device.

The device-friendly name, the IP address, and the port number may be pieces of information of a string type indicative of the friendly name, IP address, and port of a device, respectively. The last connected time may indicate the time when a signal was finally transmitted to a device or received from the device, for example. The last connected network access type may mean a connection type indicating that a device has accessed the network using what method. For example, the last connected network access type may be information of a string type indicative of at least one of Ethernet, 802.11, MoCA, Bluetooth, and ZigBee.

The recently connected device list may include a device description. The device description may be access information, for example, a URI or a URL on which information about a device, such as device capabilities, may be accessed. The client device CD may obtain capability information of a device using the URI or URL of a device description when performing device discovery.

The device discovery performed by the client device CD may be automatically started when the client device CD accesses a local network or may be started in response to a device discovery request from a user to the local application 110.

First, the client device CD may unicast a unicast device discovery request message to devices, having a recent history of connection within the network, based on the recently connected device list. For example, in the description of the present embodiment, it is assumed that information about the first intermediate device IMD1 is included in the recently connected device list. The client device CD may unicast a unicast device discovery request message to the first intermediate device IMD1 based on the recently connected device list (step: S12).

Each device that has received the unicast device discovery request message may transmit a unicast device discovery response message to the client device CD as a response to the unicast device discovery request message. For example, the first intermediate device IMD1 that has received the unicast device discovery request message may transmit a unicast device discovery response message to the client device CD as a response to the unicast device discovery request message (step: S13).

The client device CD that has received the unicast device discovery response message may update the recently connected device list based on the received unicast device discovery response message (step: S14). For example, the intermediate device manager 124 of the client device CD may update the last connected time, last connected network access type, etc. of the first intermediate device IMD1 into new information on the recently connected device list based on information included in the unicast device discovery response message.

The unicast device discovery message may include a message code field. The message code may be information on which whether the message is a request message or a response message is determined. Furthermore, the unicast device discovery message includes at least one unicast device discovery entry field. The unicast device discovery entry field may include a device-friendly name field into which a device-friendly name is inserted, an IP address field into which an IP address is inserted, a port number field into which a port number is inserted, a last connected type field into which the last connected time is inserted, a network access type field into which a network access type is inserted, etc.

The unicast device discovery message may include a device information item field. The device information item field may be used to obtain various pieces of information about a device from which the client device CD is discovered, for example, the first intermediate device IMD1. For example, the client device CD may insert information to be obtained, for example, information about device capability items into the device information item field of the unicast device discovery request message and transmit the unicast device discovery request message to the first intermediate device IMD1.

In response thereto, the first intermediate device IMD1 may insert the requested information of the first intermediate device IMD1 into the device information item field of the device discovery response message and transmit the device discovery response message to the client device CD. In response thereto, the client device CD may update the information of the first intermediate device IMD1 based on the received information of the first intermediate device IMD1.

Meanwhile, the client device CD that has updated the recently connected device list based on the unicast device discovery response message may update an active device list (step: S15). The active device list may be information about network devices that are in a currently active state. For example, since the first intermediate device IMD1 that has transmitted the unicast device discovery response message is a currently active state, the client device CD may update that the first intermediate device IMD1 is in the active state into the active device list.

The local application 110 of the client device CD may display the updated active device list or the updated recently connected device list on a screen of the client device CD. Accordingly, the user may rapidly check currently available devices in the network based on the active device list or the recently connected device list displayed on the client device CD.

Meanwhile, the client device CD may multicast (or broadcast) a multicast device discovery request message to the devices connected to the network. For example, the client device CD may transmit the multicast device discovery request message to the first intermediate device IMD1 and the second intermediate device IMD2 (steps: S16 and S17).

Assuming that the second intermediate device IMD2 is not present in the recently connected devices, the second intermediate device IMD2 is in a state in which it has not yet been discovered by the client device CD. Accordingly, the second intermediate device IMD2 may transmit the multicast device discovery response message to the client device CD in response to the multicast device discovery message received from the client device CD (step: S19). The first intermediate device IMD1 may transmit the multicast device discovery response message to the client device CD, but may not transmit the multicast device discovery response message to the client device CD if it has transmitted the unicast message to the client device CD (step: S18).

The client device CD may update the recently connected device list based on the received multicast device discovery response message (step: S20). For example, the intermediate device manager 124 of the client device CD may newly add information about the second intermediate device IMD2 to the recently connected device list.

Furthermore, the client device CD may update the active device list based on the received multicast device discovery response message. The local application 110 may display the newly updated active device list or the updated recently connected device list on a screen of the client device CD.

Meanwhile, when the device discovery procedure is completed, the client device CD displays a list of the discovered devices, for example, the updated recently connected device list or the active device list on a screen of the client device CD. The user may select an intermediate device that will stage the selected content prior to the displayed device list. In the present embodiment, it is assumed that the user has selected the first intermediate device IMD in the device list. A user interface may generate a device selection signal in response to a user's selection. The client device CD may select the first intermediate device IMD1 as a target device that will stage the content (e.g., download, play back, and consume the content) in response to the device selection signal.

When the first intermediate device IMD1 is selected as the target device, the client device may obtain the device capabilities of the first intermediate device IMD1 through a device capability exchange procedure. For example, the intermediate device manager 124 of the client device CD may transmit a device capability request message, requesting the device capabilities of the first intermediate device IMD1, to the first intermediate device IMD1 (step: S3). In response to the device capability request message, the first intermediate device IMD1 may transmit a device capability response message, including the requested device capabilities, to the client device CD (step: S4).

Meanwhile, the client device CD may obtain the device capabilities of the first intermediate device IMD1 when performing the device discovery. In such a case, the client device CD may obtain the device capabilities even without performing an additional device capability request (step: S3) and response (step: S4). For example, the client device CD may insert information about a device capability item to be obtained into the device information item field of the unicast device discovery request message and transmit the unicast device discovery request message to the first intermediate device IMD1. The first intermediate device IMD1 may insert the requested device capability items into the device information item field of the unicast device discovery response message and transmit the unicast device discovery response message to the client device CD. Accordingly, the device capabilities of the first intermediate device IMD1 may be transferred to the client device CD through the device discovery procedure. In such a case, an additional device capability request and response procedure may be omitted.

FIG. 6 shows a table illustrating the structure of device capabilities in the content service system.

As shown in FIG. 6, the device capability may include capability items, such as a device ID, a device name, a device-friendly name, a user ID, a current power source, a charging status, a power level, supporting media profiles, supporting codec types, a storage capacity, storage function groups, a point node, a storage usage, a maximum size of a queue request, a maximum number of queue requests, the current number of queue requests, the network interface number of entries, the network access type, a media transport, and a bandwidth limit.

The device ID may mean an ID that identifies a device globally and uniquely. A value of the device ID may be string type information. The device name may mean a universally unique ID for a device. A value of the device name may be, for example, string type information. The device-friendly name is a short description for an end user, and a value of the device-friendly name may be string type information. The user ID is an ID that identifies an end user, and a value of the user ID may be string type information.

The current power source is a description indicative of a current power source of a device, and a value of the current power source may be a string. A value of the current power source may be set as, for example, "AC Power" indicating that a device is supplied with AC power, "batter" indicating that a device is supplied with power from a battery, or the like. Assuming that a device is supplied with AC power from an AC source, a value of the current power source may be set as 'AC Power". I a device is supplied with power from a battery, a value of the current power source may be set as 'battery'.

The charging status is a capability item indicative of a current charging status of a battery, and a value of the charging status may be string type information. A value of the charging status may be set as 'Available' meaning that a battery has been installed in a device and the installed battery is working, 'Charging' meaning that a battery has been installed in a device and the battery is being charged, 'Unavailable' meaning that a battery has not been installed in a device, 'Error' indicating that a battery has been installed in a device, but the battery does not correctly perform a function, or the like.

The power level may indicate a current power level of a battery. For example, a value of the power level may be a percentage value. For example, '0' may mean that a battery has been fully discharged or a battery has not been installed. '100' may mean that a battery has been fully charged.

The supporting media profile may indicate a supportable media profile type. A value of the supporting media profile is information of a string form and may include supportable picture quality information, supportable DRM-related information, etc. The picture quality information may be set as, for example, 'HD' meaning High Definition (HD), 'SD' meaning Standard Definition (SD), 'PD' meaning Portable Definition (PD), or the like. The DRM-related information may include a DRM name, DRM information, a DRM version, etc. The supporting media profile may be used as the DRM capability information of a device for a rights check. For example, the QPE of the client device may obtain the DRM capabilities of the first intermediate device from the supporting media profile.

The supporting codec type is a list of supported codec types, and a value of the supporting codec types may be string type information. The storage capacity may indicate an available amount of storage.

The storage function groups indicates the storage of a device, for example, a function group related to a virtual storage device, and a value of the storage function groups may be string type information. A value of the function groups may be 'access control', 'capacity management', 'expiration', 'transformation', 'playlist', or the like.

The 'access control' indicates an access control function group that intermediates between different applications that use a virtual storage device. The access control function group can preclude, for example, a specific application from accessing content associated with another application.

The 'capacity management' may indicate a capacity management function group on which a virtual storage device enables a corresponding storage space to be managed based on priority. The capacity management group may discard an asset having lower priority in order to make a room for an asset having higher priority, for example, if the asset having higher priority is downloaded.

The 'expiration' may indicate an expiration function group on which a virtual storage device enables content to be stored based on a specific date range. The 'transformation' may indicate a transformation function group that allows a transformative operation while content is read or written from a virtual storage device.

The 'playlist' may indicate a playlist function group on which a virtual storage device enables a playlist to be processed. If a playlist function group is present, a playlist can be used in group objects.

Meanwhile, the storage usage may indicate the current available amount of storage. A value of the storage usage may be a percentage value. For example, if a value of the storage usage is '0', it may mean that storage is completely unoccupied. If a value of the storage usage is '100', it may mean that storage is fully occupied.

The maximum size of a queue request, the maximum number of queue requests, the current number of queue requests, and the network interface number of entries may indicate a maximum size of a queue request, a total number of queue requests that may be presented for a given time, the current number of queue requests other than a complete state, and the number of network interfaces, respectively.

The network access type may indicate an available network access interface type. A value of the network access type may be string type information. A value of the network access type may be, for example, 'Ethernet', '801.11', 'Bluetooth', or '3G''WiMAX'.

The media transport may indicate a transport protocol type that is supported for the interfaces D3, D4, and D1. A value of the media transport may be, for example, 'HTTP' or 'RTP'. The bandwidth limit may indicate an available bandwidth of the network interface.

Meanwhile, device capabilities may include a UPnP-defined or vendor-specific structure for indicating the DRM capabilities of a device. Device capabilities may include a UPnP device description including the DRM information of a corresponding device. For example, the UPnP device description may include an extension that is defined by a UPnP connection manager DCP. The client device CD may obtain the DRM capabilities of the first intermediate device IMD1, that is, a target device, from a UPnP device description.

Meanwhile, if the number of assets corresponding to the selected content is plural at step S1, the client device CD may obtain an asset suitable for the capabilities of the first intermediate device IMD1 based on the device capabilities of the first intermediate device IMD1 that are obtained through a device capability exchange with the first intermediate device IMD1 or device discovery. For example, if the first intermediate device supports the playback of content having HD picture quality in the supporting media profile of the device capabilities of the first intermediate device IMD1, the client device CD may select an HD-level asset from a plurality of assets. In contrast, if the first intermediate device IMD1 does not support HD picture quality, but supports the playback of content having SD picture quality, the client device CD may select an SD-level asset.

When an asset is selected at step S1 or an asset suitable for the first intermediate device is selected based on device capabilities, the client device CD that has obtained the device capabilities of the first intermediate device IMD1 may generate a queuing request that requests the selected asset to be downloaded from a specific entity, for example, the content server 200 to the first intermediate device IMD1 based on the device capabilities. The queuing request may include a codec type media profile, a container type, a Multipurpose Internet Mail Extension (MIME) type, a store name, a total length of the queuing request, content information, and policy information in addition to a URI corresponding to the selected asset. The queuing request may include bandwidth information corresponding to each source URI that has been estimated by the local application 110.

The queuing request newly generated as described above may shift to a blocked, waiting, or active state depending on the policy of the queuing request and the current operating condition of the client device CD. In general, if the queuing request is suitable for the policy and the operating condition, the queuing request enters the active state.

When the queuing request is generated, the client device CD according to the present invention may perform a rights check process before the queuing request is activated (step: S5) and shift the queuing request to the active state or the blocked state based on a result of the rights check. To this end, the generated queuing request temporarily waits until the rights check is completed.

A rights check process is described below. The client device CD may perform a rights check process for the use of the asset by the first intermediate device IMD1, that is, a target device (step: S5). The rights check may include a DRM capability check for checking whether or not the first intermediate device IMD1 supports a DRM system that protects the selected asset and a license check for checking whether or not the first intermediate device has rights to use the asset.

The rights check process may be performed before the queuing of a request is performed on the first intermediate device IMD1 in order to stage the content. For example, the rights check process may be performed when the client device CD requests the asset to be staged through the first intermediate device IMD1 capable of directly consuming the asset or when the client device CD capable of directly consuming the asset requests an staged asset through the first intermediate device IMD1. In the rights check, before the asset is transmitted, the content server 200 or the intermediate device IMD1 may be allowed to determine that a target QPE has content protection infrastructure required to consume the asset. In such a case, a bandwidth and storage can be optimized, and a user is prevented from viewing content that is unable to be consumed by the user.

Figure 7:
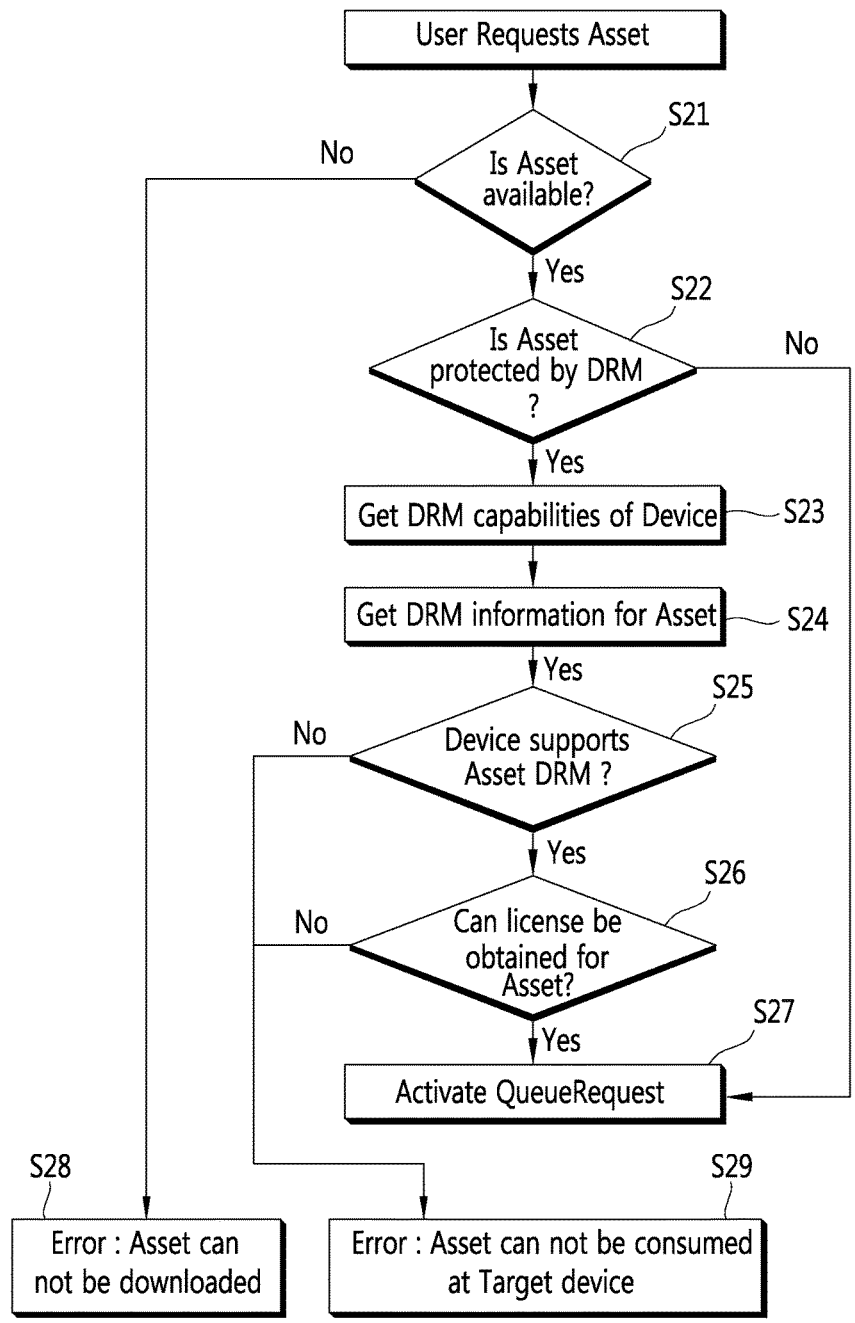
FIG. 7 is a flowchart illustrating a license check process for the use of assets by a target device.

FIG. 7 is a flowchart illustrating a license check process for the use of assets by a target device. The rights check process may be performed by the QPE 120 of the client device.

As shown in FIG. 7, first, the client device CD determines whether or not a selected asset (i.e., the asset of a queuing request for which downloading will be requested) is available (step: S21). If the selected asset is not available, the client device CD generates an error (step: S28). When the error is generated, the client device CD may display a message indicative of the generation of the error. For example, the message may indicate that the asset may not be downloaded.

If the asset is available, the client device CD may determine whether or not the asset has been protected by a DRM (or content protection) system (step: S22). For example, the client device CD may determine whether or not the asset has been protected by DRM by checking the DRM information of the asset. In this case, if the asset has not been protected by DRM, the client device CD activates a queuing request. In contrast, if the asset has been protected by DRM, the client device CD performs a right check process for the asset.

In the rights check process, the client device CD may obtain the DRM capabilities of the first intermediate device IMD1, that is, a target device (step: S23). That is, the client device CD may obtain information about whether or not the first intermediate device IMD1 supports, for example, Open Mobile Alliance (OMA), Window Media DRM (WMDRM) by Microsoft, and Digital Entertainment Content Ecosystem (DECE) for the asset.

The client device CD may request information about supportable DRM from the first intermediate device IMD1, that is, a target device. The first intermediate device IMD1 may determine DRM capabilities based on its own evaluation and send the DRM capabilities to the client device CD. If the first intermediate device IMD1 is unable to evaluate the device, however, the client device CD may obtain the DRM capabilities of the first intermediate device IMD1 from the device capabilities of the first intermediate device IMD1 which have been received from the first intermediate device IMD1 through a device capability exchange with the first intermediate device IMD1 or device discovery. That is, the device capability exchange process may be used to determine the DRM capabilities.

For example, the client device CD may directly obtain the supported DRM information of the first intermediate device IMD1 through a UPnP device description or "ConnectionManagerGetProtocolInfo". If the first intermediate device supports UPnP Content Directory Service (CDS), the first intermediate device may be a sink device (or media renderer) or a source device (or media server) in the UPnP CDS. The client device CD may host the first intermediate device that supports the UPnP CDS, for example, as a sink device or a source device and obtain the DRM information of the asset, for example, a Multipurpose Internet Mail Extension (MIME) type as a value of a content format ("ContentFormat") item from protocol information, for example, "SinkProtocolInfo( )" or "SourceProtocolInfo( )" provided by the sink device or the source device.

Meanwhile, as described above, the device capabilities of the first intermediate device IMD1 may include a UPnP-defined or vendor-specific structure for indicating the DRM support of the first intermediate device IMD1. For example, the device capabilities may include a UPnP device description including the DRM information of a corresponding device. The UPnP device description XML may include an extension of an extension UPnP connection manager DCP. The following schema is an example indicative of the WMDRM information of the UPnP device description XML.

```
?xml version="1.0"?>
    <root              xmlns="urn:schemas-upnp-org:device-1-0"
xmlns:ms="urn:microsoft-com:wmc-1-0">
    <specVersion>
    <major>1</major>
    <minor>0</minor>
    </specVersion>
    <device ms:X MS SupportsWMDRM="true">
    <deviceType>urn:schemas-upnp-
org:device:MediaRenderer:1</deviceType>
    <friendlyName>IP-STB</friendlyName>
    <manufacturer></manufacturer>
    <manufacturerURL>http://www.manufacturer.-
se</manufacturerURL>
    <modelDescription>Home Media Access</modelDescription>
    <modelName>1510</modelName>
    <modelNumber>1.0</modelNumber>
    <modelURL>http://www.manufacturer.se/products
ipstb.htm</modelURL>
    <serialNumber>1210384283</serialNumber>
    <UDN>uuid:13141813-3188-6353-314159265358979</UDN>
```

As in the schema, the UPnP device description may include information indicative of the DRM information of a device. The client device CD may obtain the DRM information of the first intermediate device IMD1 that is included in the extended structure of such a UPnP device description.

Meanwhile, a content protection tree in a device capability response may include DRM information. In such a case, the client device CD may obtain the DRM information of the first intermediate device IMD1 from a specific device capability item of the device capabilities. For example, the client device CD may obtain the DRM capabilities of the first intermediate device IMD1 from the supporting media profile of the device capabilities in the structure of FIG. 6. A value of the supporting media profile is information of a string form and may include supportable picture quality information, supportable DRM-related information, etc. A schema below illustrates the XML of a supporting media profile.

```
    <contentProtocol name="exampleCP">
    <supportingMediaProfiles>dece/hd</supportingMediaProfiles>
    <contentProtection
    schemeIdUri="http://www.examplecp.org/contentProtectionSchemes/
CP1">     <SchemeInformation>Example     Content     Protection
1.0</SchemeInformation>
    </contentProtection>
    </contentProtocol>
```

As described above, the supporting media profile may include a supportable media profile type and DRM information (e.g., DECE). Such a data structure may further include a DRM name, DRM information, a DRM version, etc. The QPE 120 of the client device CD may obtain the DRM capabilities of the first intermediate device IMD1 from the supporting media profile.

Meanwhile, the client device CD obtains DRM information from the metadata of the asset (step: S24). The DRM of the asset may be specified as any one of Dynamic Adaptive Streaming over HTTP (DASH) Media Presentation Description (MPD) information, UPnP CDS metadata, and MIME type information. For example, the asset DRM may be defined in an MPD that uses a content protection element. If the asset is defined to use UPnP CDS, a serving intermediate device may indicate a content protection property that uses an MIME type. If the asset uses the source URI (REQPROP_SOURCE_URI) property of a queuing request, a queuing request type (REQPROP_TYPE) property is also specified as the content MIME type including the DRM information. The MIME type may be specified as the same manner, for example, within the UPnP CDS.

For example, if a content server that provides the asset supports UPnP Content Directory Service (CDS), the content server may be a DLNA Digital Media Server (DMS), a UPnP media server or the like. The client device CD may host the content server which supports CDS, for example, a DMS or a UPnP media server and access a CDS item that encapsulates asset metadata in the UPnP. For example, the client device CD may search the protocol information "ProtocolInfo", exposed by CDS, for the DRM information of the asset.

Protocol information according to the protocol information of the CDS is used to describe the following formatted string.

<protocol>":"<network>":"<contentFormat>":"<additionalInfo>

The resources of an MIME type of the protected asset is indicated in a content format "ContentFormat". Accordingly, the client device CD may obtain the DRM information of the asset from the content format of the protocol information. The following schema shows an example of an extended MIME type that describes MPEG2-PS resources delivered as an OMA DCF file.

The following example extended the MIME type describes a MPEG2-PS resource that is delivered as an OMA DCF file:

"application/vnd.oma.drm.dcf;
CONTENTFORMAT=video/MP2P"

The resulting ProtocolInfo string containing the extended the MIME type additionally indicates that the file is transferred with http-get:

ProtocolInfo="http-get:*:application/vnd.oma.drm.dcf;
CONTENTFORMAT=video/MP2P:*"

Finally, the form of the <res> element content is as follows:

```
<res                     protocolInfo=            "http-
get:*:application/vnd.oma.drm.dcf;CONTENTFORMAT=video/MP2P:*"
    allowedUse="PLAY,5"
    validityStart="2004-05-30T14:30:00"
    validityEnd="2004-06-04T14:30:00">
    http://10.0.0.1:88/MyCollection/movie8126.dcf
    </res>validityEnd="2004-06-04T14:30:00">
    http://10.0.0.1:88/MyCollection/movie8126.dcf
    </res>
```

FIG. 8 shows a table illustrating UPnP CDS properties and values thereof. As shown in FIG. 8, protocol information may include information for specifying the DRM information of content, for example, "http-get:*:video/vnd.dece.mp4:*".

If the DRM capabilities of the first intermediate device IMD1 and the DRM information of the asset for the first intermediate device IMD1 are obtained, the client device CD may perform a rights check for the use of the asset through the first intermediate device IMD1 based on the obtained DRM capabilities and DRM information. The rights check may include a DRM capability check and a license check.

First, the client device CD performs a DRM capability check for verifying whether or not the first intermediate device IMD1 can support a DRM system that protects the asset based on the obtained DRM information and the DRM capabilities of the first intermediate device (step: S25). In this case, the client device CD may check whether or not the second device supports DRM that protects the asset by comparing an asset content protection request and policy according to the DRM capabilities of the first intermediate device IMD1 and the DRM information of the asset with the DRM capabilities of the first intermediate device IMD1.

For example, assuming that "video/vnd.dece.mp4", that is, a value of the content format ("ContentFormat") item, is included in "SinkProtocolInfo( )" or "SourceProtocolInfo( )" provided by the first intermediate device IMD1 supporting the UPnP CDS, for example, a sink device (or media renderer) or a source device (or media server) and the MIME type of the asset is "MIME Type=video/vnd.dece.mp4", the client device CD may compare the DRM capabilities of the first intermediate device IMD1 and the DRM information of the asset, that is, the MIME type and determine that the first intermediate device IMD1 can support DRM that protects the asset because the two pieces of information are identical with each other as "video/vnd.dece.mp4".

For example, assuming that that "video/vnd.dece.mp4", that is, a value of the content format ("ContentFormat") item, is included in "SinkProtocolInfo( )" or "SourceProtocolInfo( )" provided by the first intermediate device IMD1 supporting the UPnP CDS, for example, a sink device (or media renderer) or a source device (or media server) and "res@protocolInfo" of the UPnP CDS properties is "http-get:*:video/vnd.dece.mp4*", the client device CD may compare the DRM capabilities of the first intermediate device IMD1 with the DRM information of the asset, that is, "res@protocolInfo", and determine that the first intermediate device IMD1 supporting DECE can support the asset protected by the DECE.

For example, assuming that the supporting media profile of device capabilities of the first intermediate device IMD1 includes "DECE HD/SD" and the MIME type of the asset or "res@protocolInfo" of the UPnP CDS properties is "video/vnd.dece.mp4", the client device CD may compare the DRM capabilities of the first intermediate device IMD1 with the DRM information of the asset, that is, "res@protocolInfo" and determine that the first intermediate device IMD1 supporting DECE can support the asset protected by the DECE.

For example, assuming that "<device ms:X MS SupportsWMDRM="true">" is obtained from the UPnP device description XML and the MIME type of the asset is any one of "MIME Type=audio/x-ms-wma", "MIME Type=audio/mp3", "MIME Type=audio/wav", "MIME Type=audio/L16", and "MIME Type=audio/L16", the client device CD may determine that the first intermediate device IMD1 supporting WMDRM supports the asset whose capabilities are protected through the WMDRM.

FIG. 9 is a table illustrating DRM capabilities for the DRM capability check of the first intermediate device IMD1. FIG. 10 is a table illustrating the DRM information of an asset for a DRM capability check.

As shown in FIGS. 9 and 10, the DRM capabilities of the first intermediate device IMD1 may include capability items, such as "DRM Specific Name Space", "DRM Specific Information", "DRM Name", and "DRM version". The DRM information of the asset may include information items, such as a "Content ID", a "Source URI", a "Network, Protocol", an "MIME Type", "AdditionalInfo", a "DRM Name", and a "DRM version". In the DRM capability check, the "DRM Specific Information" of the DRM capabilities and "the MIME Type" of the asset DRM information may be used.

If, a result of the rights check, it is determined that the first intermediate device IMD1 does not support DRM that protects the asset, the client device CD generates an error (step: S29). At step S29, the client device CD may display a message indicative of the generation of the error. For example, the message may display a sentence indicating that the asset may not be consumed in the target device. In contrast, if it is determined that the first intermediate device IMD1 can support DRM that protects the asset, the client device CD performs a license check for verifying whether or not a license for the asset may be obtained (step: S26).

In the license check, whether or not the first intermediate device IMD1 may obtain (or receive) the license for the asset may be verified. The license check may request DRM-specific APIs and may be implementation-dependent. The queue/policy manager of the first intermediate device IMD1, that is, a target device, may report information about whether the license check for the asset may be performed and the device information structure 'DeviceInfo Structure' of the first intermediate device IMD1 to the client device CD.

If, as a result of the license check, it is determined that the license for the asset is unable to be obtained, the client device CD generates an error (step: S29). In contrast, if it is determined that the license for the asset is able to be obtained, the client device CD may activate a queuing request (step: S27).

A newly presented queued request may shift to any one of the blocked, waiting, and active states depending on the policy of the request and the current operating condition of the client device CD. For example, if the current operating condition of the client device CD does not satisfy a criterion defined by the policy of the request, the queuing request shifts to the blocked state. If the current operating condition of the client device CD satisfies the criterion of the request, but another request having higher priority is required to be processed, the queuing request shifts to the waiting state. That is, another request having higher priority may be processed prior to a waiting request. If the current operating condition of the client device CD satisfies the policy of the request, the queuing request needs to shift to the active state and the request is a request having the highest priority for downloading.

The rights check may be performed before the queuing request enters the active state and may be integrated into device capability discovery and a content policy. A queuing request that fails in the rights check shifts to the blocked state, and a queuing request that is successful in the rights check shifts to the active state. For example, if a DRM capability check for a generated queuing request has failed or a license check has failed, the queuing request shifts to the blocked state and an error is generated (step: S29). Accordingly, the asset is unable to be downloaded. In contrast, if the DRM capability check for the generated queuing request and the license check are normally successful, the queuing request becomes the active state (step: S27).

As described above, before making a queuing request from a target device in order to stage content, the client device CD determines whether or not the asset has been protected by DRM by checking the DRM information of the asset. If the asset has been protected by DRM, the client device CD obtains DRM capability information essential for a target device through a device capability exchange with the target device and verifies whether the target device supports the DRM of the asset. The client device CD may verify that the target device can obtain an essential license for the asset and consume the asset.

When the queuing request is activated, the client device CD may send a queuing request on which the asset is staged in the target device to the target device (step: S6). The queuing request is made so that the target device downloads the asset from the content server 200. The client device may send the queuing request to the first intermediate device IMD1 via the Q3 interface.

The first intermediate device IMD1 that has received the queuing request may access the content server 200 based on information included in the queuing request and download a media file suitable for the first intermediate device IMD1, corresponding to the selected asset, from the content server 200 (step: S7). Meanwhile, in some of the present embodiment, the server that provides the asset has been illustrated as being the content server 200. According to an implementation environment, however, the server that provides the asset may be a specific device within a local network (e.g., a home network) or may be a device on the service provider side.

Although the preferred embodiments of the present invention have been illustrated above, those skilled in the art will appreciate that the present invention may be modified in various ways without departing from the spirit and scope of the present invention defined in the appended claims. Accordingly, a possible change of the embodiments of the present invention will not depart from the technology of the present invention.

What is claimed is:

1. A method for downloading content, which is performed by a first device, the method comprising:
   obtaining digital rights management (DRM) information for an asset from asset metadata associated with the asset;
   obtaining a DRM capability on a second device;
   performing a rights check; and
   transmitting a request for staging the asset through the second device to the second device based on the rights check,
   wherein the performing of the rights check includes:
      performing a DRM capability check to verify whether the second device can support a DRM system protecting the asset based on the DRM information and the DRM capability on the second device that are obtained; and
      performing a license check to verify whether the second device can obtain a license for the asset.

2. The method of claim 1, further comprising:
   receiving a content list from a server; and
   selecting at least one asset based on the received content list.

3. The method of claim 1, further comprising:
   transmitting a device capability request requesting a capability of the second device to the second device;
   receiving a device capability response including the capability of the second device from the second device; and
   selecting at least one asset suitable for staging through the second device based on the received device capability.

4. The method of claim 1, further comprising:
   checking the DRM information obtained from the asset metadata associated with the asset; and determining whether the asset is protected by the DRM system, based on the checking the DRM information.

5. The method of claim 1, wherein the DRM information of the asset is specified by at least one of DASH (Dynamic Adaptive Streaming over HTTP) MPD (Media Presentation Description) information, UPnP (Universal Plug and Play) CDS (Content Directory Service) metadata and MIME (Multipurpose Internet Mail Extension) type information.

6. The method of claim 1, wherein the rights check is used when the first device transmits the request for staging the asset through a second device which directly consumes the asset, or the first device which directly consumes the asset request an asset staged through the second device, performed before the request enters into an active state, and when the rights check fails, a request requiring the rights check is transited to a blocked state.

7. The method of claim 1, wherein the obtaining of the DRM capability on the second device includes obtaining the DRM capability on the second device from a content format value of a UPnP (Universal Plug and Play) device description or UPnP CDS (Content Directory Service) protocol information of the second device.

8. The method of claim 1, wherein the obtaining of the DRM capability on the second device includes obtaining the DRM capability on the second device from a specific field included in the device capability received from the second device through exchanging of the device capability with the second device, and
wherein the specific field is a supporting media profile field, and the DRM information is a media profile.

9. The method of claim 1, wherein the performing of the DRM capability check of the second device includes checking whether the second device supports the DRM protecting the asset, by comparing asset content protecting demand and policy according to the DRM capability of the second device and the DRM information of the asset with the DRM capability of the second device, and
wherein the DRM information of the asset is specified by one of DASH (Dynamic Adaptive Streaming over HTTP) MPD (Media Presentation Description) information, UPnP (Universal Plug and Play) CDS (Content Directory Service) metadata and MIME type information.

10. The method of claim 1, further comprising:
performing device discovery based on a recently connected device list; and
discovering the second device based on the device discovery.

11. The method of claim 10, wherein the performing of the device discovery includes:
storing the recently connected device list including information about a device which is recently connected through a network;
unicasting a first device discovery request to another device included in the recently connected device list, when connected to the network;
receiving a first device discovery response to the first unicast device discovery request from another device; and
updating the recently connected device list based on the received first device discovery response.

12. The method of claim 11, further comprising:
updating an active device list representing an active state device based on the received first device discovery response; and
displaying at least one of the updated active device list and the updated recently connected device list,
wherein the selecting of the second device includes selecting the second device in one of the displayed active device list and the updated recently connected device list.

13. A first device, comprising:
an application configured to select an asset and a target device; and
an engine configured to:
obtain digital rights management (DRM) information for an asset from asset metadata associated with the asset,
obtain a DRM capability on a second device,
perform a rights check, and
transmit a request for staging the asset through the second device to the second device based on the rights check,
wherein the engine performs the rights check by:
performing a DRM capability check to verify whether the second device can support a DRM system protecting the asset based on the DRM information and the DRM capability on the second device that are obtained, and
performing a license check to verify whether the second device can obtain a license for the asset.

14. The first device of claim 13, wherein the engine checks the DRM information obtained from the asset metadata associated with the asset, and determines whether the asset is protected by the DRM system based on the checking of the DRM information by the engine.

15. The first device of claim 13, wherein the DRM information of the asset is specified by at least one of DASH (Dynamic Adaptive Streaming over HTTP) MPD (Media Presentation Description) information, UPnP (Universal Plug and Play) CDS (Content Directory Service) metadata and MIME (Multipurpose Internet Mail Extension) type information.

16. A system, comprising:
a second device; and
a first device configured to:
obtain digital rights management (DRM) information for an asset from asset metadata associated with the asset,
obtain a DRM capability on the second device,
perform a rights check, and
transmit a request of requesting staging the asset through the second device to the second device based on the rights check,
wherein the first device performs the rights check by:
performing a DRM capability check to verify whether the second device can support a DRM system protecting the asset based on the DRM information and the DRM capability on the second device that are obtained, and
performing a license check to verify whether the second device can obtain a license for the asset.

17. The system of claim 16, wherein the first device checks the DRM information obtained from the asset metadata associated with the asset, and determines whether the asset is protected by the DRM system based on the checking of the DRM information by the first device.

18. The system of claim 16, wherein the DRM information of the asset is specified by at least one of DASH (Dynamic Adaptive Streaming over HTTP) MPD (Media Presentation Description) information, UPnP (Universal Plug and Play) CDS (Content Directory Service) metadata and MIME (Multipurpose Internet Mail Extension) type information.

\* \* \* \* \*